(12) United States Patent
Gharb

(10) Patent No.: US 6,552,654 B1
(45) Date of Patent: Apr. 22, 2003

(54) SECURITY SYSTEM WITH A MOBILE TELEPHONE

(76) Inventor: Samy Gharb, Bachtobelstrasse 30, CH-8045 Zurich (CH)

( * ) Notice: Subject to any disclaimer, the term of this patent is extended or adjusted under 35 U.S.C. 154(b) by 0 days.

(21) Appl. No.: 09/762,111
(22) PCT Filed: May 25, 2000
(86) PCT No.: PCT/CH00/00294
§ 371 (c)(1),
(2), (4) Date: Apr. 5, 2001
(87) PCT Pub. No.: WO00/74983
PCT Pub. Date: Dec. 14, 2000

(30) Foreign Application Priority Data

Jun. 3, 1999 (CH) .............................................. 1042/99

(51) Int. Cl.[7] .............................................. B60R 25/10
(52) U.S. Cl. ..................... 340/426; 340/998; 340/995; 340/573.1; 340/574; 340/539; 455/345; 455/517
(58) Field of Search ................................ 340/426, 988, 340/995, 573.1, 574, 539, 998; 455/345, 517

(56) References Cited

U.S. PATENT DOCUMENTS

| | | | | | |
|---|---|---|---|---|---|
| 5,497,149 | A | * | 3/1996 | Fast | 340/988 |
| 5,731,785 | A | * | 3/1998 | Lemelson et al. | 340/825.49 |
| 5,805,055 | A | * | 9/1998 | Colizza | 340/426 |
| 5,898,391 | A | * | 4/1999 | Jefferies et al. | 340/988 |
| 5,959,529 | A | * | 9/1999 | Kail, IV | 340/539 |

* cited by examiner

Primary Examiner—Daniel J. Wu
Assistant Examiner—Hung Nguyen
(74) Attorney, Agent, or Firm—Burns, Doane, Swecker & Mathis, L.L.P.

(57) ABSTRACT

A security system is activated by a remote control (A) via a main relay (B) and an alarm signal is generated by a sensor unit (C) with at least one sensor. The alarm signal is processed in the PLC control units (D, F, G, H, I) and with a recording device (K), and the alarm information is transmitted in the form of adata set via a mobile telephone. The PLC control units are client-specifically programmed with a computer (PC) during the start-up process and the information is transmitted to them via a mobile line (50, 51, 52). The invention is suitable for use in the monitoring of vehicles and security cases. In particular, the security device can be integrated into a satellite locating system with which the position can be represented on a monitor.

10 Claims, 8 Drawing Sheets

SECURITY SYSTEM WITH A MOBILE TELEPHONE

BACKGROUND OF THE INVENTION

1. Field of the Invention

The invention relates to a security system with a mobile telephone for monitoring objects, in particular vehicles and security cases, and a method for operating such a system.

2. Brief Description of the Related Art

The monitoring or protecting of objects, in particular vehicles and security cases, is becoming more and more important today.

Various security systems are known for protecting vehicles, for example, alarm systems with automatic alarm triggering, at the onset of which a loud horn signal is heard if unauthorized persons attempt to enter the vehicle. But if an unauthorized person is successful in deactivating the alarm system, the vehicle may be stolen, and its recovery frequently becomes an insurmountable problem.

SUMMARY OF THE INVENTION

It is the objective of the invention at hand to propose a security system in which the alarm is reported via a mobile telephone connection.

A further objective is to describe a method for operating a system in which a satellite locating system is included for locating the vehicle.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Referring to the drawing figures, like reference numerals designate identical or corresponding elements throughout the several figures.

Figure 1:
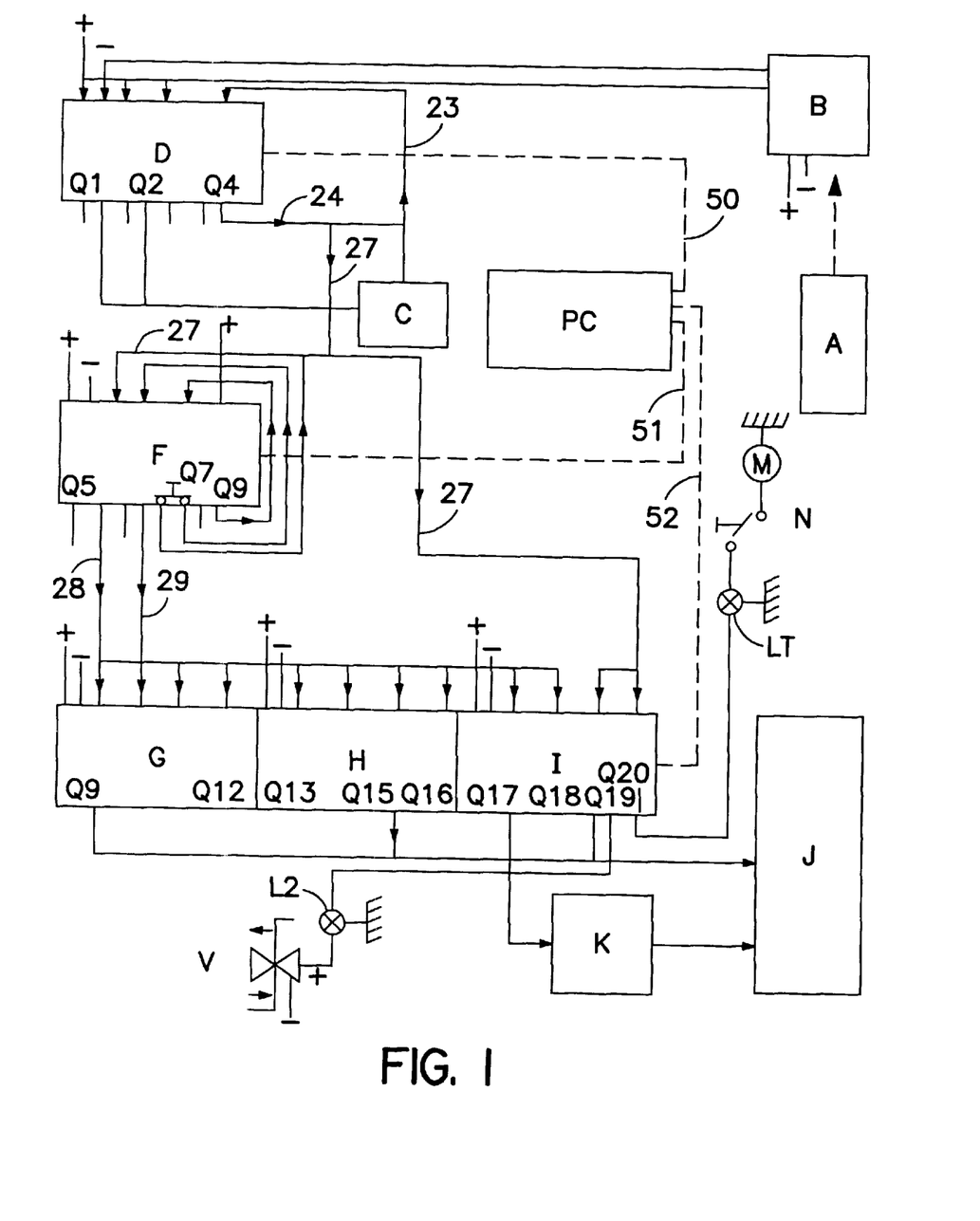
FIG. 1 is shows a schematic portrayal of a security system with a mobile telephone.

FIG. 1 shows a schematic portrayal of a security system with a mobile telephone, for example, by Natel.

A main relay B is located on the input side at the 12 V power supply of a motor vehicle, while the outputs are connected with a first PLC (Programmable Logic Controller) controller D, transmit to it, and provide it with outputs Q1 to Q4. The main relay B is controlled by mean of a remote control A of a known type via an infrared interface, and is not described in detail.

The PLC controller D is used essentially to trigger the start of the alarm functions. For alarm detection, one or more of the sensors are combined into a sensor unit C. For this purpose, known proximity sensors (IR sensors) are provided as sensors and are located in the vehicle in such a way that they are able to emit an output signal as an alarm signal upon a door opening or window opening. As a rule, one sensor of this type is provided per door. For clarity, FIG. 1 shows only one sensor of this type. If several sensors are present, the outputs are switched in parallel.

Output Q1 is connected with the sensor unit C and emits the start signal for the operating readiness of the sensors.

Output Q2 is also connected with the control unit C and provides the start signal for the operating readiness of the sensors at night, which is accomplished via a timer and will be described later.

The time windows for operating readiness during the day and at night are individually freely selected by means of outputs Q1 and Q2; this results in high flexibility and is of great importance for low-cost system operation.

The sensor unit C is connected via lines 23 and 24 with the PLC controller D; i.e., the sensors are hereby kept active or passive within certain time windows. Line 23 transmits the start alarm signal of the sensor(s) of the sensor unit C for 30 seconds. Line 24, which connects output Q4 with the sensor unit, transmits the command alarm signal for 6 hours, so that an alarm signal can be actively transmitted within this time window.

The alarm signal that is supplied simultaneously via lines 24 and 27 to a second PLC controller F and a fifth PLC controller I is present at output Q4.

The PLC controller F with outputs Q5–Q8 is essentially used for alarm repetition or repeating the alarm signal. If, due to a busy mobile telephone connection, the alarm information cannot be transmitted, it is automatically repeated one or more times. Outputs Q5 and Q6 are provided, for example, for a first and second repetition, whereby the corresponding outputs are connected via lines 28 and 29 with a third PLC controller G, which is provided with outputs Q9–Q12.

Lines 28 and 29 are connected simultaneously with a fourth PLC controller H with outputs Q13–Q16 located parallel to PLC controller G and with a fifth PLC controller I with outputs Q17–Q20.

Outputs Q7 and Q8 provide the start signals for the repetition or respectively for the suppression of a repetition, i.e., Q7 for alarm signal No. 2 during the day and Q8 for suppressing alarm signal No. 2 at night.

PLC controllers G, H, and I essentially are used to activate a mobile telephone J and a digital recording device K as well as several other functions related to the vehicle, i.e., ignition and fuel pump.

Outputs Q9 to Q15 provide the four pieces of information necessary for starting the mobile telephone; i.e., at the output Q9 the command "mobile telephone ON," at output Q10 the command "1—code," at output Q11 the command "2—code," at output Q12 the command "3—OK," and at output Q15 the command "4—emergency number."

Output Q17 is connected with the digital recording device K, in which the emergency message is stored, retrieved, and can be transmitted to the mobile telephone J. Output Q18 transmits the command "mobile telephone OFF."

Outputs Q19 or Q20, respectively, are used in case of an alarm to interrupt the power supply to the fuel pump V or respectively to the ignition N, whereby the display lamps L2 (red) and L1 (green) arranged in the corresponding circuits are no longer illuminated.

Naturally, the PLC controllers F, G, H, and I, the mobile telephone J, and the recording device K are also supplied over the same 12 V supply, which is only partially indicated.

All components of the security system except for the remote control are located in the vehicle at inconspicuous, barely visible places.

If, in case of an alarm, at least one of the sensors responds, the power supply to the fuel pump and ignition is interrupted, the emergency number is dialed in the mobile telephone, and the emergency text is transmitted. If the line is busy, the alarm information is repeated once or several times in freely selectable intervals, for example, every two minutes.

FIG. 1 furthermore shows a computer PC (Personal Computer) that is connected via mobile lines 50, 51, and 52 with PLC controllers D, F, and G, H, I. All necessary information for programming the PLC controllers from the PC or PC database are read via these lines, and the PC system is then disconnected from the security system. In this manner, the security system is programmed at the initial startup, so that customer preferences can easily be taken into consideration.

Figure 2:
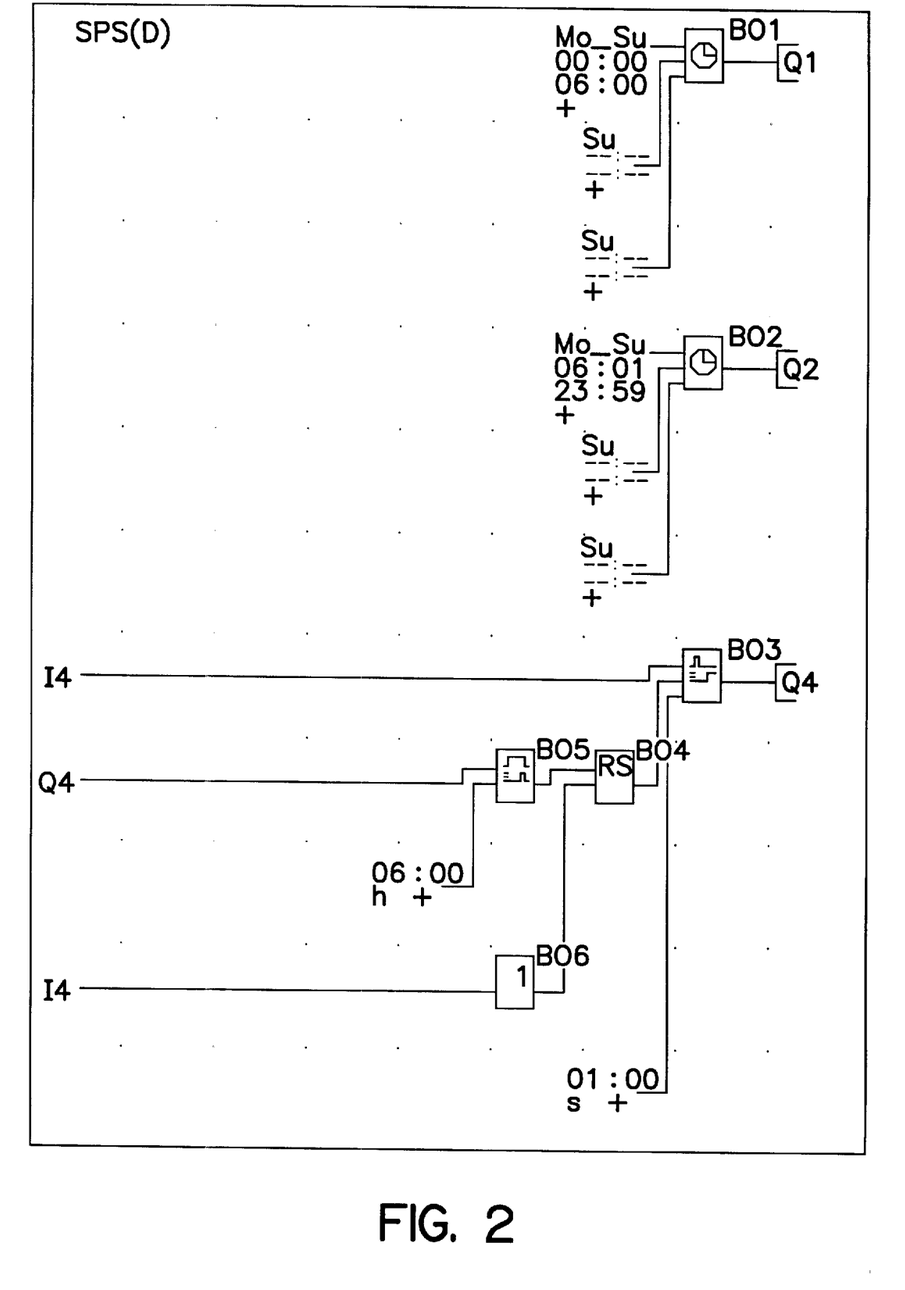
FIG. 2 shows an overview circuit diagram of the PLC (Programmable Logic Controller) controller D.
Figure 3:
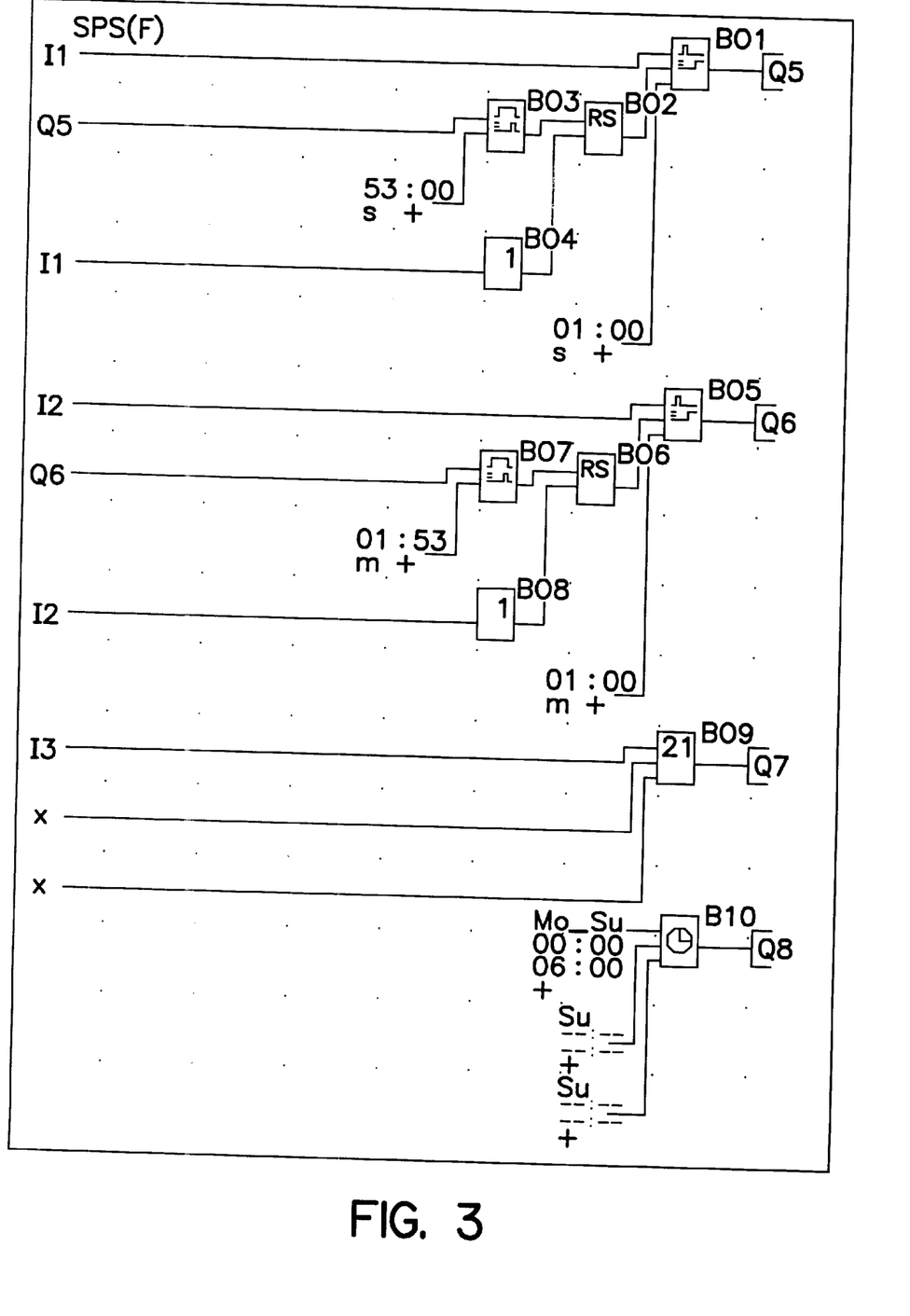
FIG. 3 shows an overview circuit diagram of the PLC controller F.
Figure 4:
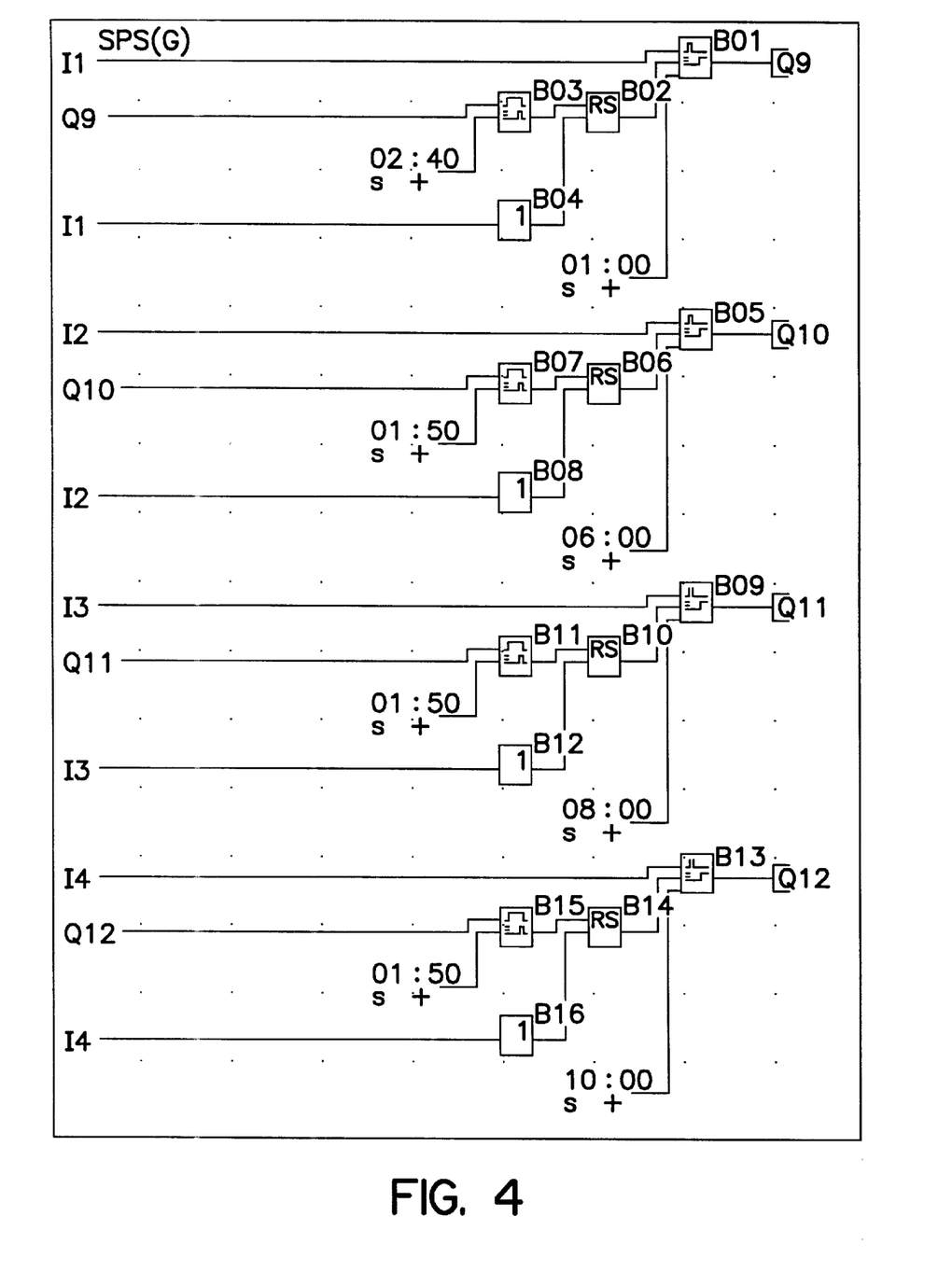
FIG. 4 shows an overview circuit diagram of the PLC controller G.
Figure 5:
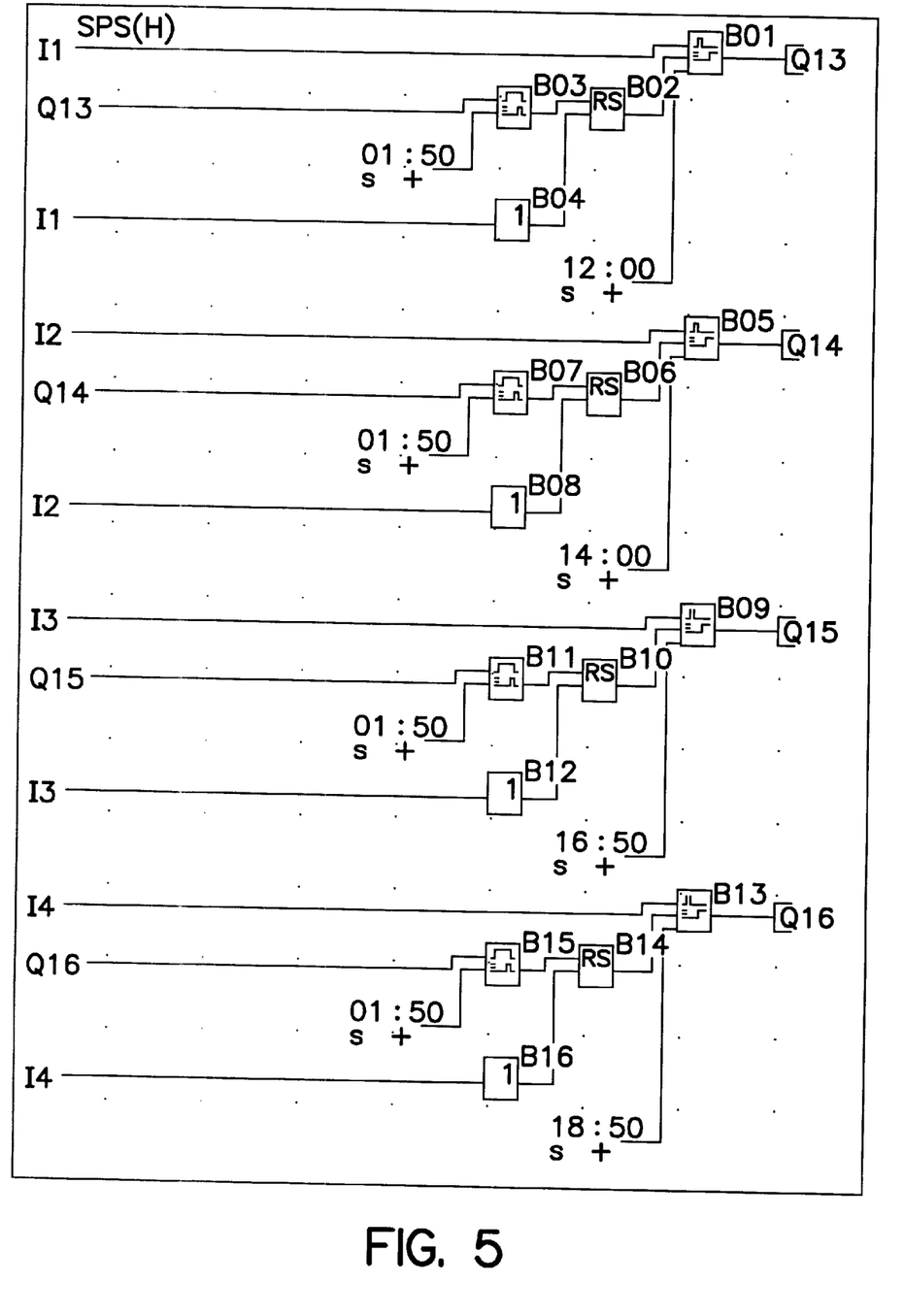
FIG. 5 shows an overview circuit diagram of the PLC controller H.
Figure 6:
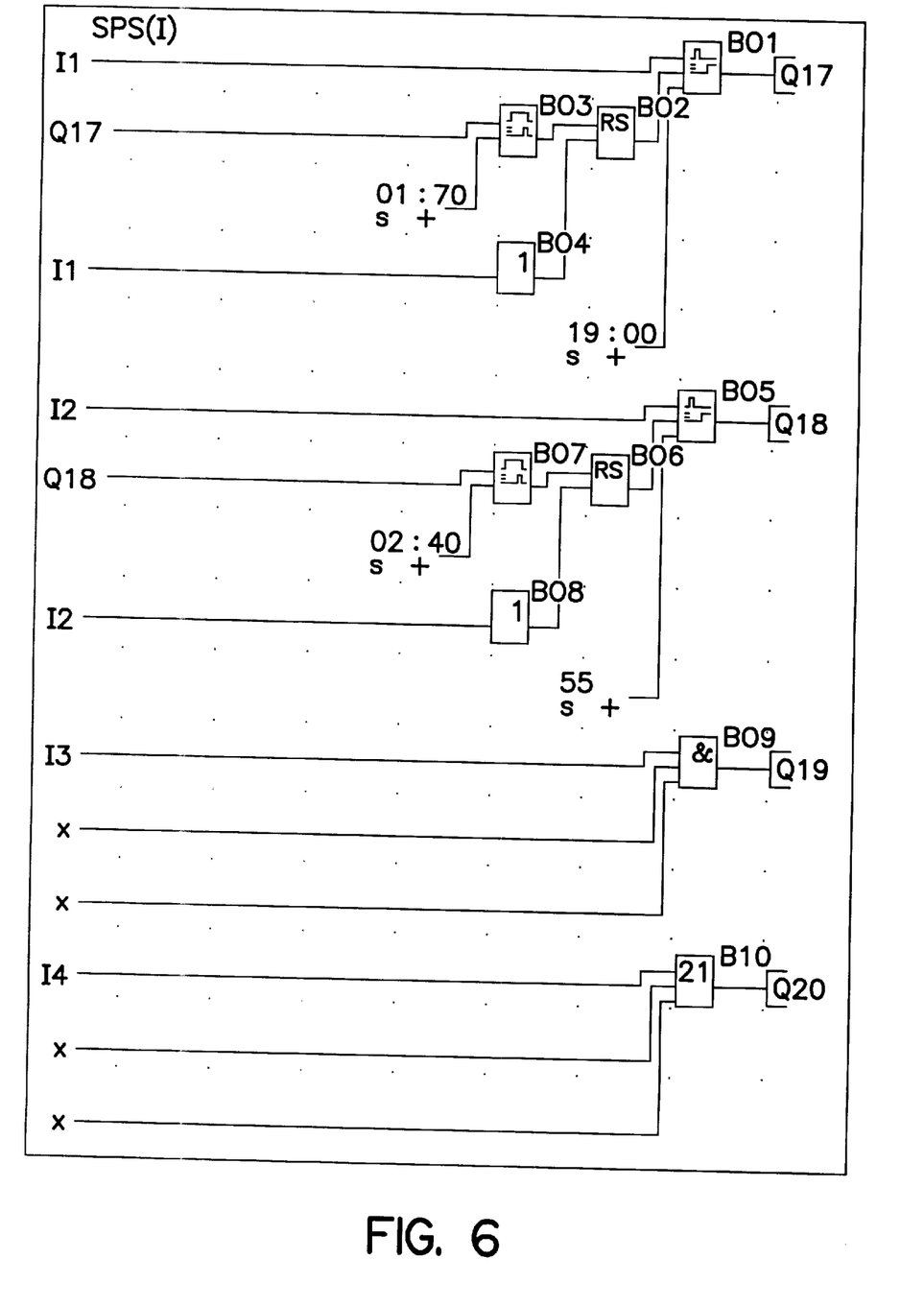
FIG. 6 shows an overview circuit diagram of the PLC controller I.

FIG. 2 shows the overview circuit diagram of the PLC controller D. A first timer function B01 or the block No. B01 defines a time window from 00.00 to 06.00, in which output Q1 is on "HIGH." Analogously, output Q2 is on 'HIGH' for a second timer function B02 in a time window from 06.01 to 23.59. Blocks No. B03 to B06 contain on and off switching functions.

FIGS. 3 to 6 show the overview circuit diagrams of the PLC controllers F, G, H, and I. Analogously to FIG. 2, they contain already described known functions, such as time functions and on/off functions (relays), and are not described in more detail.

In an exemplary embodiment that corresponds to FIG. 1 in its construction and is provided as a security system for a vehicle, five PLC controllers, a mobile telephone, and a digital recording device are used as control units.

The control functions are summarized in the following table:

| PLC | Relay No. | Command | Time |
| --- | --- | --- | --- |
| D | Q1 | System ON/OFF at night | 00.00 H–05.59 H |
| D | Q2 | System ON/OFF during the day | 06.00 H–11.59 H |
| D | Q3 | Reic | |
| D | Q4 | Alarm signal for 6 h | 01.00 s–06.00 H |
| F | Q5 | Alarm signal No. 1 | 01.00 s–53.00 s |
| F | Q6 | Alarm signal No. 2 | 01.00 m–01.53 m |
| F | Q7 | Alarm signal No. 2 ON/OFF (NOR circuit) | |
| F | Q8 | No alarm signal No. 2 | 00.00 H–05.59 H |
| G | Q9 | Mobile telephone ON | 01.00 s–02.40 s |
| G | Q10 | Pin Code 1 | 06.00 s–01.50 s |
| G | Q11 | Pin Code 2 | 08.00 s–01.50 s |
| G | Q12 | Pin Code 3 | 10.00 s–01.50 s |

-continued

| PLC | Relay No. | Command | Time |
| --- | --- | --- | --- |
| H | Q13 | Pin Code 4 | 12.50 s–01.50 s |
| H | Q14 | OK | 14.00 s–01.50 s |
| H | Q15 | Emergency number | 16.50 s–01.50 s |
| H | Q16 | OK | 18.50 s–01.50 s |
| I | Q17 | Start emergency message | 19.90 s–01.70 s |
| I | Q18 | Mobile telephone OFF | 55.50 s–02.50 s |
| I | Q19 | Solenoid ON (AND circuit) | |
| I | Q20 | Ignition OFF (NOR circuit) | |

One use of the security system with a mobile telephone according to the invention is in the localization of vehicles via a satellite locating system. A known system of this type is offered by Eutelsat under the name "EUTELTRACS-SYSTEM" and permits the determination of the location of vehicles with an accuracy of 100 meters (Ref. QTRACKS/ 400 system software for AS/400 computer systems by IBM).

Figure 7:
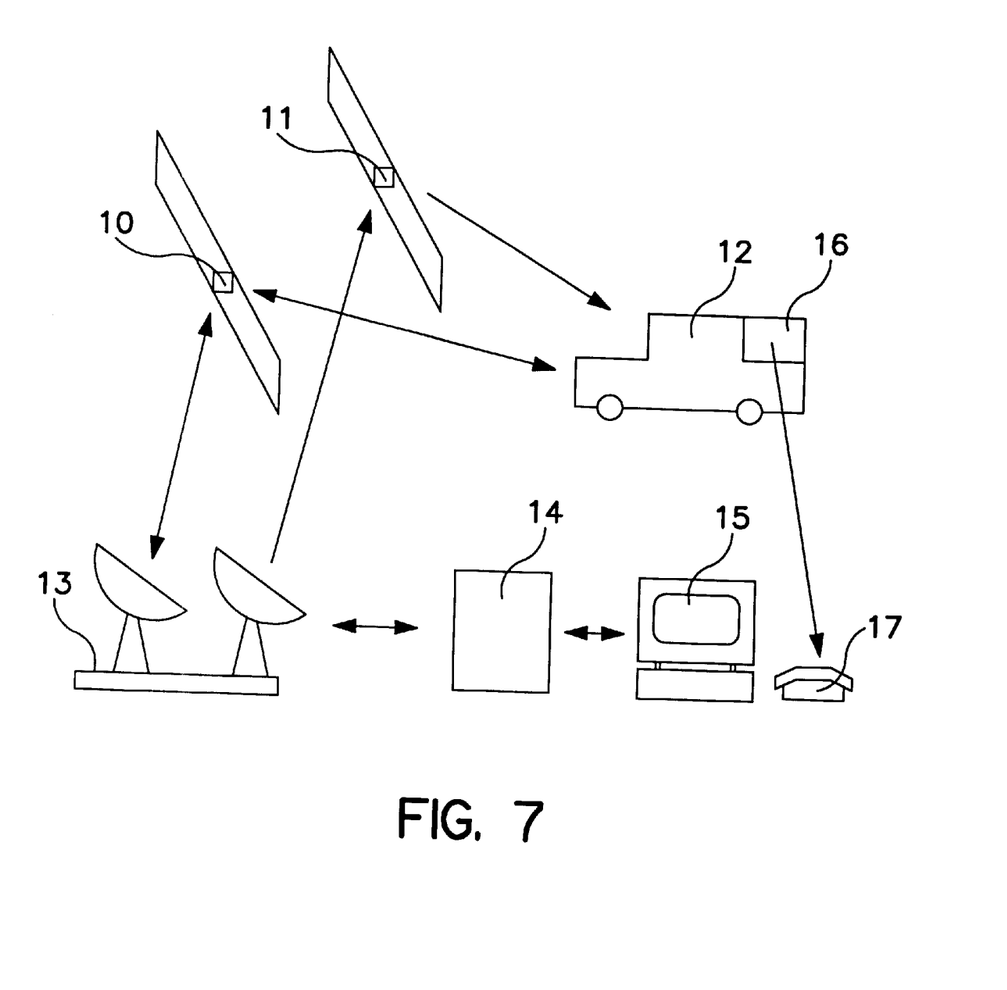
FIG. 7 shows a security system with mobile telephone, integrated into a satellite locating system.

FIG. 7 shows the security system with mobile telephone integrated into a satellite locating system.

A system for mobile satellite communications for vehicles is known under the name EUTELTRACS. Two geostationary EUTEL satellites, i.e., a communications satellite 10 and a positioning satellite 11 with a coverage of all of Western and Eastern Europe, the Mediterranean region, and the Middle East continuously send and receive messages sent by the mobile devices 12 and the terrestrial station 13 to the respective recipient. The positions of vehicles are thereby determined with an accuracy of 100 m. The terrestrial station is in communication with a service provider 14 who transmits all messages and positioning messages via terrestrial networks or satellite networks to the end customer. The latter has a Dispo-PC 15, i.e., a computer with screen on which a position can be displayed. This EUTELTRACS system is not described here in any more detail.

According to the invention, the security system 16 with mobile telephone is now built into the mobile device 12, which, as a rule, is a road vehicle, but also may be, for example, a motor yacht.

Should an alarm occur, the end customer is notified by mobile telephone on a telephone 17. He then turns on his PC 15, selects the position display, and is then able to initiate the tracking.

This makes it possible after an alarm to locate a stolen vehicle via the service provider on the screen of a PC, for example, in the street grid of a major city, and to track it.

Figure 8:
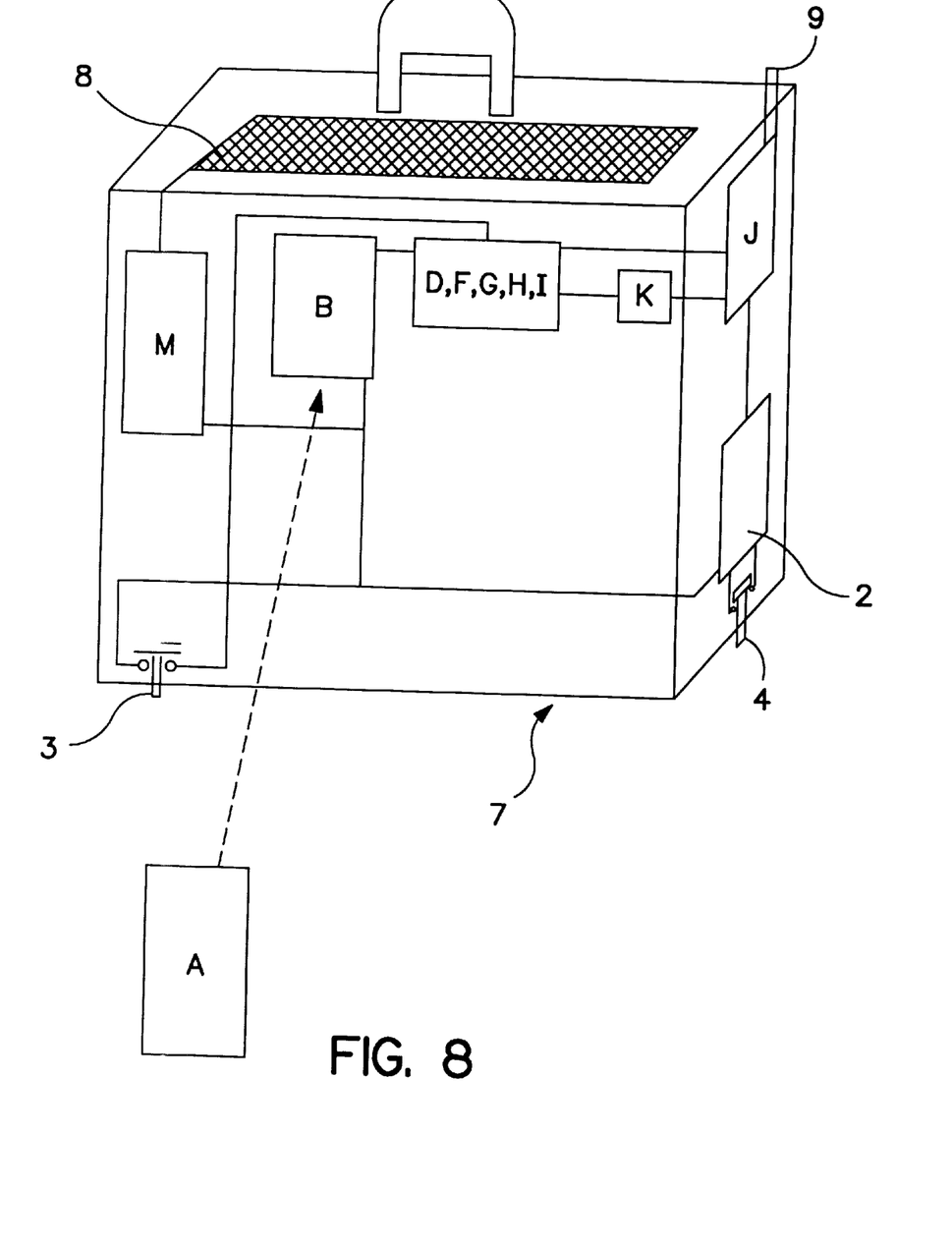
FIG. 8 shows a security system with mobile telephone, integrated into a security case.

FIG. 8 shows a security system with mobile telephone integrated into a security case for monitoring in a satellite locating system.

The components of the security system already described for FIG. 1, such as the main relay B, the PLC controllers D, F, G, H, I, the recording device K, and the mobile telephone J are built into a security case 1. A power supply 2 is connected on one side to the mobile telephone, the main relay, and a satellite communications device M, and on the other side via a switching element 3 to the PLC controllers. The switching element is attached inconspicuously on the underside of the security case and is constructed in such a way as a switch that the contact is closed when the security case is off the floor. Also on the underside of the security case is another switching element 4 that is connected to the power supply and activates it when it is picked up, thus starting the entire security system. For redundancy, several switching elements 3 and 4 may be provided. The security case is activated with a remote control A. All components are integrated in a side, the top, or the bottom of the case in a low-profile construction style, so that sufficient room for documents or similar items is left in the case itself.

From the satellite communications device M, an antenna cable leads to the antenna 8 that is provided for the reception of satellite signals. The antenna is mounted below the case top and not visible from the outside. A short antenna 9 of the mobile telephone J which is integrated, for example, into an edge element of the case, also is barely visible. The location of the case is continuously monitored on an IBM AS/400 computer system via the satellite communications device M and the already mentioned QTRACKS/400 system software (location display).

This fulfills a central condition for re-locating a security case.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A security system for monitoring objects, comprising:
    a digital recording device having at least one emergency message; and
    a mobile telephone having at least one preselected emergency number;
    a first Programmable Logic Controller (PLC) controller for initialing monitoring;
    a second PLC controller for repeating an alarm signal; and
    third, fourth, and fifth PLC controllers for activating a mobile telephone and a digital recording device;
    at least one sensor for generating an alarm state connected to the first PLC controller;
    a main relay for controlling the first PLC controller and which can be operated by a remote control;
    a computer having mobile lines connectable to the five PLC controllers for programming the five PLC controllers; and
    a data set for transmission to the mobile telephone including alarm information;
    wherein the second PLC controller repeats the alarm signal if the line dialed by the mobile telephone in case of an alarm, is busy; and
    wherein each time the second PLC controller repeats the alarm signal, the third, fourth and fifth PLC controllers activate the mobile telephone and the digital recording device.

2. A security system as claimed in claim 1, wherein the data set comprises a start signal, the at least one emergency number, and the at least one emergency message.

3. A security system as claimed in claim 1, wherein each of the controllers includes inputs and outputs, and wherein the outputs of the first PLC controller are connected to an input of the second PLC controller and of the fifth PLC controller, outputs of the second PLC controller are connected to inputs of the third, fourth, and fifth PLC controllers, outputs of the third and fourth PLC controllers are connected to an input of the mobile telephone, and outputs of the fifth PLC controller are connected to the recording device.

4. A security system as claimed in claim 1, wherein the fifth PLC controller is configured and arranged to control the ignition and the solenoid of the fuel pump of a vehicle.

5. A method of using a security system comprising the steps of:
    providing a security system as claimed in claim 1;
    positioning the security system inside a security case, the security case including
        an underside having at least one switching element for triggering the alarm and at least one switching element for releasing the power supply;
        a satellite communications device connected to the security system and having an antenna for communicating with a satellite locating system; and
    operating the security system for locating vehicles.

6. The method of claim 5, wherein when the security case is not in contact with a surface, the at least one switching element for the triggering the alarm triggers the alarm and the at least one switching element for releasing the power supply connects the power supply to at least one of the PLC controllers.

7. A method for operating a security system comprising the steps of:
    providing a security system as claimed in claim 1;
    entering the alarm signal and the alarm information in the PLC controllers into the mobile telephone and digital recording device, which establishes a data set;
    activating the operating status via the main relay by means of the remote control;
    generating an alarm signal via the at least one sensor of the sensor unit;
    transmitting the alarm signal to the first PLC controller, and from the first PLC controller to the second PLC controller;
    transmitting the alarm signal at least once to the third, fourth, and fifth PLC controllers, the outputs of which are used to control the mobile telephone and the recording device; and
    transmitting the data set via the mobile telephone, wherein the data set is compiled from the at least one emergency number stored in the mobile telephone, the emergency message stored in the recording device, and start and initialization signals from the third and fourth PLC controllers.

8. A method as claimed in claim 7, further comprising the steps of:
    operably connecting the security system to a vehicle having an ignition power supply and a fuel pump solenoid;
    interrupting the vehicle ignition power supply; and
    blocking the fuel pump solenoid.

9. A method as claimed in claim 7, further comprising the step of:
    repeating the alarm signal in the second PLC controller at least once if the line dialed in case of an alarm by the mobile telephone is busy, to cause the line to be redialed.

10. A method as claimed in claim 7, further comprising the steps of:
    operably connecting the security system to a vehicle having a power supply;
    supplying the security system with power via the vehicle power supply, except for the remote control that is operated externally and with a battery.

* * * * *